(12) United States Patent
Herriman et al.

(10) Patent No.: US 11,208,048 B2
(45) Date of Patent: Dec. 28, 2021

(54) VEHICLE SHELF SYSTEM AND METHOD OF USE

(71) Applicant: Adrian Steel Company, Adrian, MI (US)

(72) Inventors: Elizabeth Herriman, Adrian, MI (US); Mark Anthoney Henry, Jr., Adrian, MI (US); Richard Norman Beauleaux, Jr., Kentwood, MI (US); Timothy Alan Mouch, Saline, MI (US); Thomas Michael Willis, Petersburg, MI (US); William Wood, III, Adrian, MI (US); Mark Alan Mohr, Pittsford, MI (US)

(73) Assignee: Adrian Steel Company, Adrian, MI (US)

(*) Notice: Subject to any disclaimer, the term of this patent is extended or adjusted under 35 U.S.C. 154(b) by 49 days.

(21) Appl. No.: 16/918,118

(22) Filed: Jul. 1, 2020

(65) Prior Publication Data

US 2021/0009041 A1     Jan. 14, 2021

Related U.S. Application Data

(60) Provisional application No. 62/872,895, filed on Jul. 11, 2019.

(51) Int. Cl.
| | |
|---|---|
| *B60R 7/02* | (2006.01) |
| *B60R 11/00* | (2006.01) |
| *A47B 57/04* | (2006.01) |
| *A47B 96/02* | (2006.01) |
| *A47B 96/14* | (2006.01) |

(52) U.S. Cl.
CPC .............. *B60R 7/02* (2013.01); *A47B 57/045* (2013.01); *A47B 96/02* (2013.01); *A47B 96/14* (2013.01); *B60R 11/00* (2013.01); *B60R 2011/0019* (2013.01); *B60R 2011/0082* (2013.01)

(58) Field of Classification Search
CPC ............... B60R 7/02; B60R 2011/0019; B60R 2011/0085; B60R 2011/0082; A47B 96/02; A47B 96/025; A47B 96/027; A47B 57/045; A47B 46/00; A47B 96/07; A47B 96/021; A47B 96/14; A47B 96/1408; A47B 96/1416; A47B 96/1425; A47B 96/1433; A47B 96/1441; A47B 43/00
USPC ....................... 108/44, 48, 115, 134; 248/240
See application file for complete search history.

(56) References Cited

U.S. PATENT DOCUMENTS

| | | | |
|---|---|---|---|
| 1,228,042 A | | 5/1917 | O'Dowd |
| 1,473,850 A | | 11/1923 | Greene |
| 2,173,569 A | * | 9/1939 | Troendle ................. B60N 3/004 |
| | | | 297/146 |
| 2,574,483 A | | 11/1951 | Jack |
| 2,809,849 A | | 4/1955 | Benne |
| 3,541,976 A | * | 11/1970 | Rozas ................... A47B 23/002 |
| | | | 108/43 |

(Continued)

FOREIGN PATENT DOCUMENTS

WO    2005072130 A2    11/2005

*Primary Examiner* — Justin M Larson
(74) *Attorney, Agent, or Firm* — . Marshall & Melhorn, LLC

(57) ABSTRACT

A shelf system that may be used with a vehicle is described. The shelf system may have a shelf member that selectively pivots between a raised position and a lowered position. The shelf system may have a frame system as well as a sub-frame system to support it within the vehicle.

19 Claims, 11 Drawing Sheets

(56) References Cited

U.S. PATENT DOCUMENTS

| | | | | |
|---|---|---|---|---|
| 4,159,122 | A | 6/1979 | Stevens | |
| 4,730,738 | A | 3/1988 | Bartus et al. | |
| 4,971,234 | A | 11/1990 | Hay | |
| 5,472,103 | A | 12/1995 | Merl | |
| 5,620,123 | A | 4/1997 | Brisbois | |
| 5,655,459 | A * | 8/1997 | O'Connor | A47B 5/06 108/134 |
| 5,720,535 | A | 2/1998 | Mehman | |
| 5,803,524 | A | 9/1998 | McCammon | |
| 5,970,887 | A * | 10/1999 | Hardy | A47B 46/00 108/108 |
| 6,196,141 | B1 | 3/2001 | Herron, III et al. | |
| 6,487,979 | B2 * | 12/2002 | Ash | A47B 5/02 108/134 |
| 6,962,116 | B2 | 11/2005 | Bienick et al. | |
| 7,338,110 | B1 | 3/2008 | Eckloff | |
| 7,367,616 | B2 * | 5/2008 | Summerford | A47C 9/06 297/14 |
| 7,401,709 | B2 | 7/2008 | Stingel, Jr. et al. | |
| 7,757,615 | B2 | 7/2010 | McDonald, II et al. | |
| 7,963,383 | B2 | 6/2011 | Stingel, III et al. | |
| 8,267,017 | B1 | 9/2012 | Michael et al. | |
| 8,286,779 | B2 * | 10/2012 | Stingel, III | B65G 1/026 198/347.1 |
| 8,915,561 | B2 | 12/2014 | Eichman et al. | |
| 8,919,715 | B2 * | 12/2014 | Terada | A47B 96/061 248/235 |
| 8,944,483 | B2 * | 2/2015 | Richter | A47B 57/485 296/24.44 |
| 9,004,427 | B2 | 4/2015 | Irudayaraj et al. | |
| 9,173,486 | B2 * | 11/2015 | Richter | A47B 96/02 |
| 9,260,046 | B2 | 2/2016 | Mowry et al. | |
| 9,452,865 | B2 | 9/2016 | Joshi et al. | |
| 9,688,168 | B2 * | 6/2017 | Gratz | B60N 2/3027 |
| 9,764,692 | B2 | 9/2017 | Beere | |
| 9,770,102 | B2 | 9/2017 | Conod | |
| 9,820,564 | B2 | 11/2017 | Mullins | |
| 9,878,649 | B2 | 1/2018 | Beere | |
| 9,969,317 | B2 | 5/2018 | Eichstedt et al. | |
| 10,094,156 | B2 * | 10/2018 | Jaworski | B60P 1/36 |
| 10,149,535 | B2 | 12/2018 | O'Keefe et al. | |
| 10,258,152 | B1 | 4/2019 | Lentine et al. | |
| 10,358,170 | B2 | 7/2019 | Khatri et al. | |
| 10,384,581 | B2 | 8/2019 | Preisler et al. | |
| 10,384,593 | B2 * | 8/2019 | Altobelli | B60R 7/005 |
| 10,470,565 | B1 * | 11/2019 | Levi | A47B 57/42 |
| 10,589,652 | B2 | 3/2020 | Preisler et al. | |
| 10,710,492 | B2 * | 7/2020 | Eichstedt | B60R 9/045 |
| 10,779,641 | B2 * | 9/2020 | Beere | A47B 96/061 |
| 2003/0000656 | A1 | 1/2003 | Zen | |
| 2003/0127482 | A1 | 7/2003 | Gort | |
| 2003/0155318 | A1 | 8/2003 | Jacobs et al. | |
| 2004/0055514 | A1 | 3/2004 | DeLand et al. | |
| 2006/0033351 | A1 | 2/2006 | Taylor | |
| 2006/0059840 | A1 | 3/2006 | Taylor | |
| 2007/0095773 | A1 | 5/2007 | Schwerman | |
| 2007/0119808 | A1 | 5/2007 | Wishart et al. | |
| 2008/0012372 | A1 * | 1/2008 | Squyres | B60P 1/00 296/24.44 |
| 2008/0012375 | A1 | 1/2008 | Steiger et al. | |
| 2008/0253857 | A1 | 10/2008 | McJunkin | |
| 2009/0173705 | A1 * | 7/2009 | Stingel, III | B65G 1/026 211/150 |
| 2010/0326936 | A1 | 12/2010 | Hanley | |
| 2011/0018411 | A1 | 1/2011 | Steiger et al. | |
| 2011/0260488 | A1 | 10/2011 | Bliss, Jr. et al. | |
| 2011/0315647 | A1 * | 12/2011 | Andersson | A47B 96/061 211/90.01 |
| 2013/0307285 | A1 | 11/2013 | Richter | |
| 2014/0251933 | A1 | 9/2014 | Old et al. | |
| 2014/0252057 | A1 | 9/2014 | Workman et al. | |
| 2014/0265799 | A1 | 9/2014 | Eichman et al. | |
| 2015/0203053 | A1 | 7/2015 | Carlsson | |
| 2015/0366338 | A1 * | 12/2015 | Conod | A47B 43/00 108/48 |
| 2016/0000238 | A1 | 1/2016 | Bruegmann | |
| 2017/0088061 | A1 | 3/2017 | Balthes et al. | |
| 2017/0095076 | A1 * | 4/2017 | O'Keefe | A47B 57/045 |
| 2017/0136964 | A1 | 5/2017 | Carlsson | |
| 2018/0014638 | A1 | 1/2018 | Hanley | |
| 2018/0065564 | A1 | 3/2018 | Hanley | |
| 2019/0254422 | A1 * | 8/2019 | Beere | A47B 96/1425 |
| 2020/0187675 | A1 * | 6/2020 | Obitts | A47B 57/04 |
| 2021/0009041 | A1 * | 1/2021 | Herriman | B60R 11/00 |
| 2021/0112974 | A1 * | 4/2021 | Appelo | A47B 96/07 |

* cited by examiner

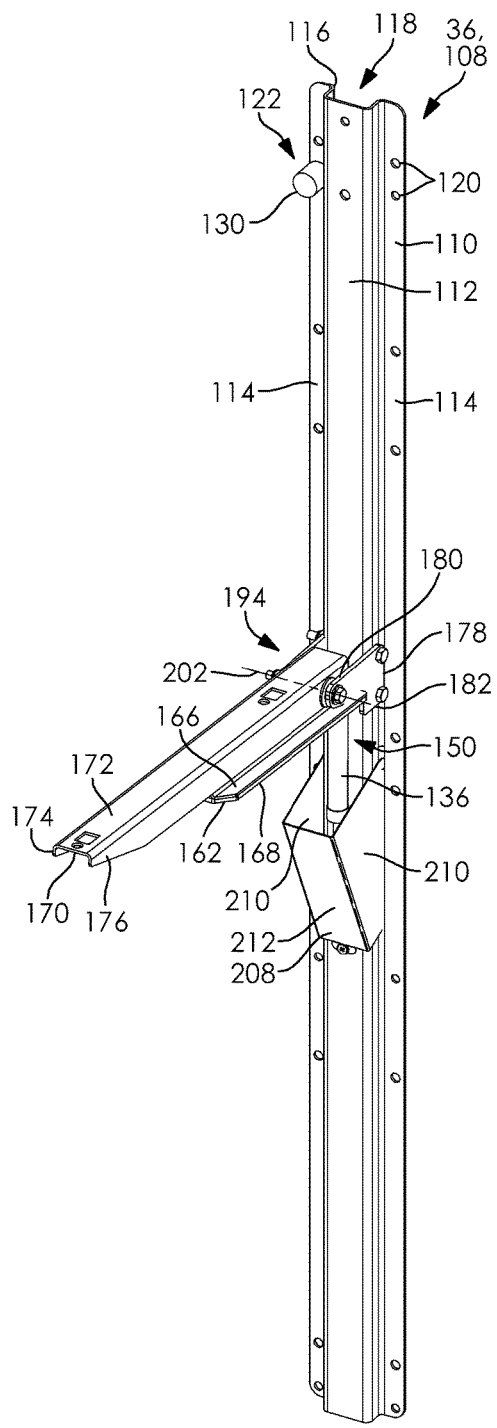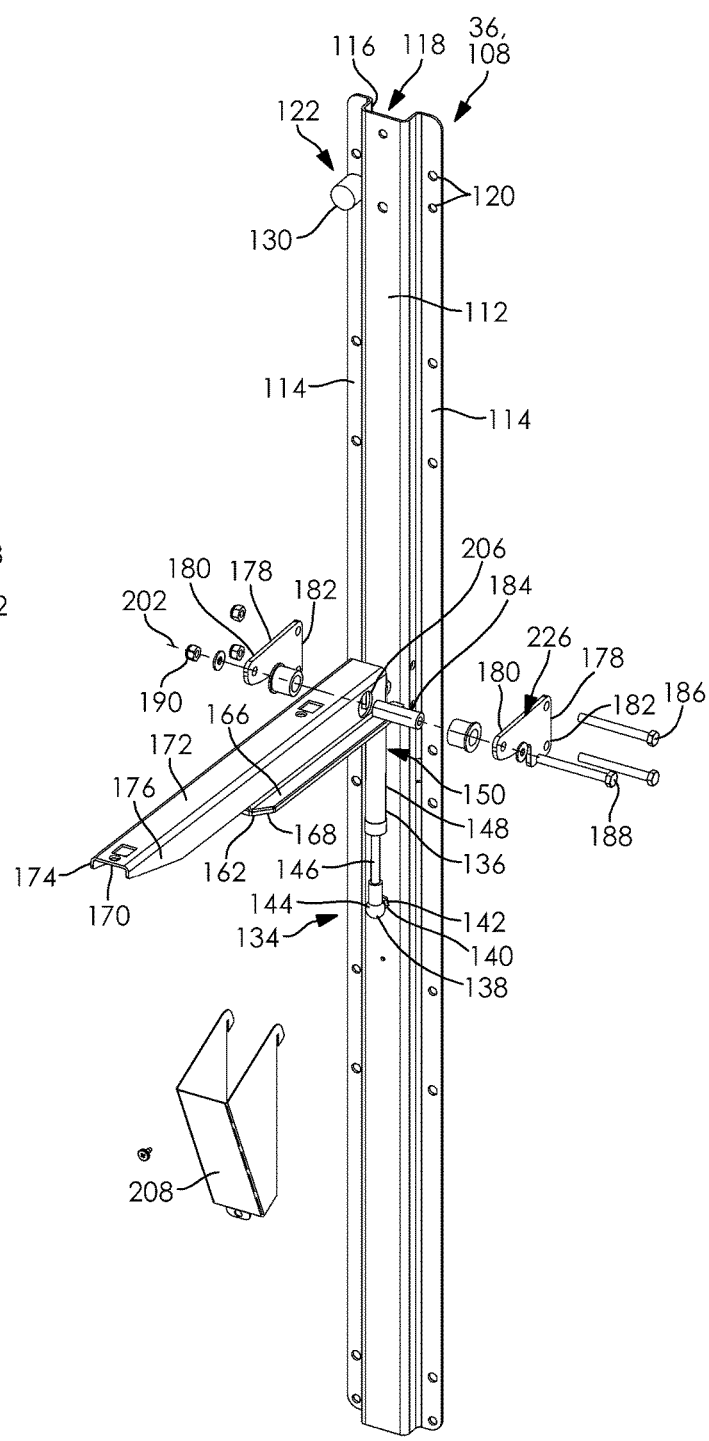
FIG. 8
FIG. 9

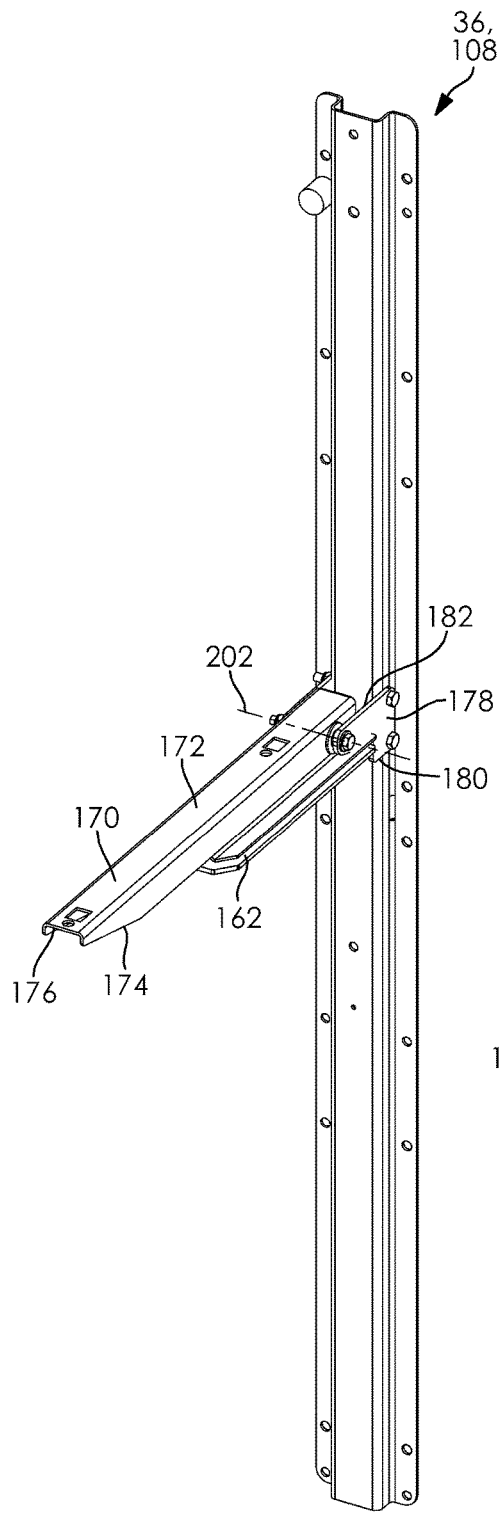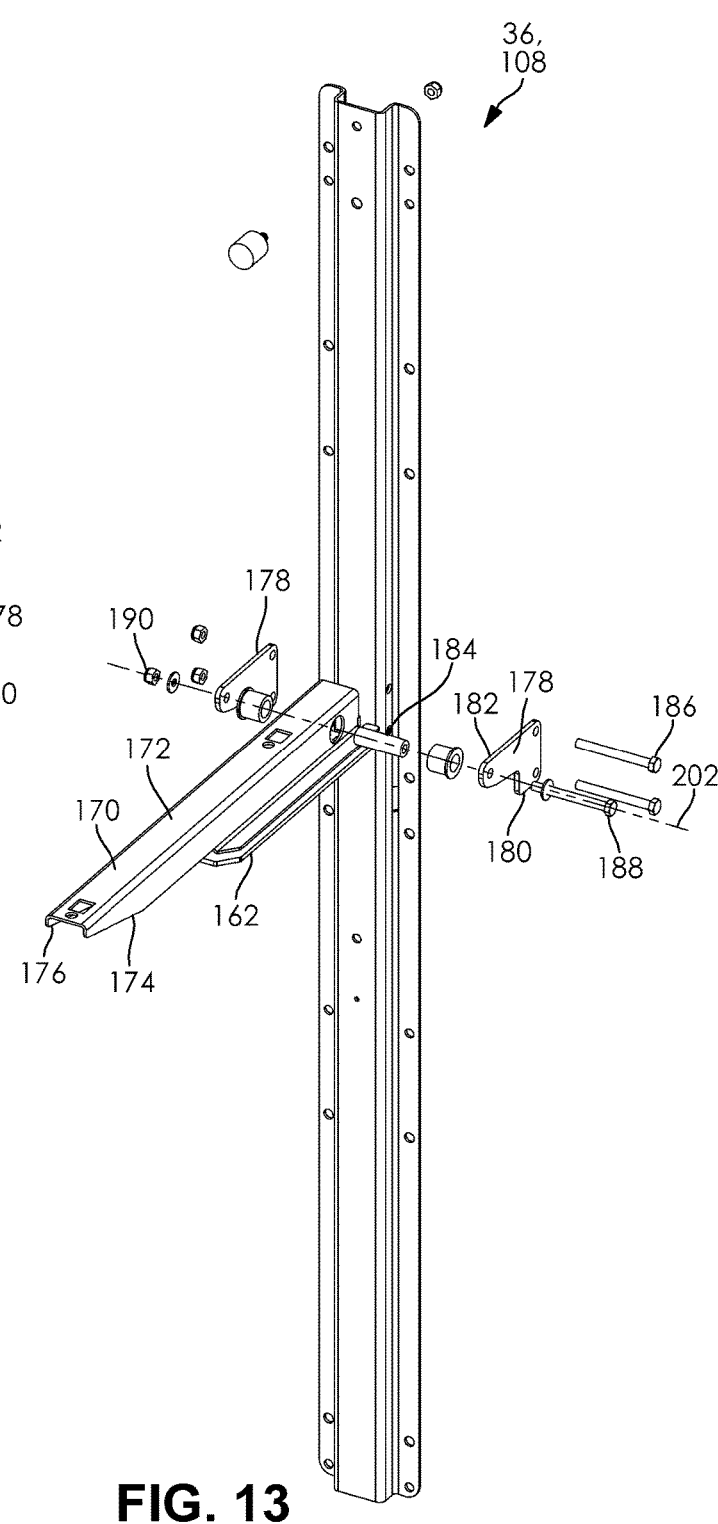
FIG. 12    FIG. 13

VEHICLE SHELF SYSTEM AND METHOD OF USE

FIELD

Described and depicted herein is one embodiment of a shelf system and a method of its use. More particularly, the shelf system may be used in an interior of a vehicle, such as a utility or cargo type vehicle.

BACKGROUND

Utility/cargo vehicles often have interior spaces that can be fit with a wide variety of structures to store and secure cargo therein, such as shelving. The disadvantage with some shelves is that they often have a fixed position within the vehicle and they cannot be stowed when they are not in use. These prior art shelves take up valuable space when they are not needed.

Some shelves can be stowed when not in use. These shelves, however, have complicated designs, which causes them to be expensive to manufacture. The manufacturing expense is passed on to consumers which makes the shelves expensive. The complicated designs also result in additional failure modes.

It would be advantageous for a vehicle shelf to be simple, yet robust, easily manufacturable and low cost, and be easily positioned within the vehicle and readily adjustable between a stowed position and a use position.

SUMMARY

A shelf system may have at least one upright member. The system may also have a biasing member having a first end and a second end. The first end may be directly attached to the upright member via a ball stud, and the second end may be connected to an under-shelf bracket. A shelf member supported by the under-shelf bracket and adapted for pivotal motion with respect to the upright members may also be provided. In addition, a spanner bracket having a first end portion connected the at least one upright member and a second end portion forming a pivot axis for the shelf member may be provided. The pivot axis may be located inboard of an intersection of the under-shelf bracket and the biasing member.

In another aspect, the shelf system may have a first and a second upright member. Each upright member may have a central body flange bounded by two side flanges. Each side flange may be coplanar with one another but are not coplanar with the central body flange. The first and second upright members may be spaced apart from one another.

In another aspect, the biasing member may be a piston.

In another aspect, the second end of the biasing member may have a flat with an aperture. The flat may be received within two mounting ears. The ears may each have apertures aligned with the aperture in the flat. A fastener may extend through the all of the apertures.

In another aspect, the mounting ears may be formed on an end portion of a mounting plate. The mounting plate may be connected to the under-shelf bracket.

In another aspect, the under-shelf bracket may have two parallel ribs connected by a central flange. The mounting plate may be connected under the ribs and be parallel the central flange.

In another aspect, aligned apertures may located through the ribs, and a bushing may be located in the apertures and a fastener may be located in the bushing. The bushing, the apertures and the fastener form part of, and are aligned with, the pivot axis.

In another aspect, the spanner bracket may be L-shaped, and the second end portion may have an aperture for receiving the fastener therethrough. The spanner bracket may cantilever the shelf member from the upright member.

In another aspect, the aperture in the second end portion of the spanner bracket forms part of, and is aligned with, the pivot axis.

In another aspect, the shelf system may have a first upright member and a second upright member. The upright members may form an upright member plane. The system may also have at least one floor rail with a U-shaped cross section having an inner lip and an outer lip separated by an offset. The outer lip may be located in the upright member plane. The system may also have at least one mid-rail with a Z-shaped cross section made of a upstanding flange, a mid-span flange and a downstanding flange. The downstanding flange may be coplanar with the outer lip and the upright member plane. The system may also have at least one upper rail of substantially constant thickness. The rail may have a longitudinal portion and at least one transverse portion extending from the longitudinal portion. The upper rail may reside in the upright member plane.

In another aspect, the upright members may have a central flange bounded by two side flanges. The side flanges may reside in the upright member plane.

In another aspect, at least one cross piece spans between and connects the upright members together.

In another aspect, a planar panel is located between the upright members and is attached to the side flanges so that the planar panel is located in the upright member plane.

In another aspect, a shelf member may be adapted for pivotal attachment to the upright members via a biasing member connected to one of the upright members and the shelf member.

In another aspect, a pivot axis may be provided for the shelf member with respect to a spanner bracket connected to an upright member. The pivot axis may be located above a connection between a biasing member and the shelf. The pivot axis may have aligned apertures in ribs of an under shelf bracket, a bushing in the apertures, and a fastener in the bushing.

In another aspect, a method of pivoting a shelf in a shelf system is provided. The method may include providing a shelf member adapted to be moved between a raised position and a lowered position, where an under-shelf bracket supports the shelf member. The method may also include pivoting the shelf member about a pivot axis formed through portion of a spanner bracket connecting the shelf member to a stationary upright member, where the pivot axis is located outboard of an under-shelf bracket and a biasing member intersection. The method may also include changing the length of a biasing member while simultaneously changing the angle of the biasing member with respect to the stationary upright member when pivoting the shelf member between the raised position and the lowered position. The method may also include cantilevering the shelf member from the at least one upright member with the spanner bracket.

In another aspect, the method may include accommodating a central flange of the upright member within an upright member recess in a back edge portion of the shelf member when the shelf member is in a lowered position.

In another aspect, the method may include accommodating a spanner bracket within a spanner bracket recess in a back edge portion of the shelf member when the shelf member is in a lowered position. The spanner bracket recess may be connected to the upright member recess.

In another aspect, in the lowered position, the shelf member does not extend into an upright member plane formed by an upright member, a portion of a floor rail, a portion of at least one mid-rail and a portion of at least one upper rail.

BRIEF DESCRIPTION OF THE FIGURES

FIG. 8 depicts a perspective, schematic view of one embodiment of an assembled shelf system;

FIG. 9 depicts a perspective, schematic view of one embodiment of an exploded shelf system;

FIG. 12 depicts a perspective, schematic view of one embodiment of an assembled shelf system;

FIG. 13 depicts a perspective, schematic view of one embodiment of an exploded shelf system.

DETAILED DESCRIPTION OF THE PREFERRED EMBODIMENTS

It is to be understood that the device herein may assume various alternative orientations and step sequences, except where expressly specified to the contrary. It is also to be understood that the specific devices and processes illustrated in the attached drawings, and described in the following specification are simply exemplary embodiments. Hence, specific dimensions, directions or other physical characteristics relating to the embodiments disclosed are not to be considered as limiting, unless expressly stated otherwise.

Figure 1:
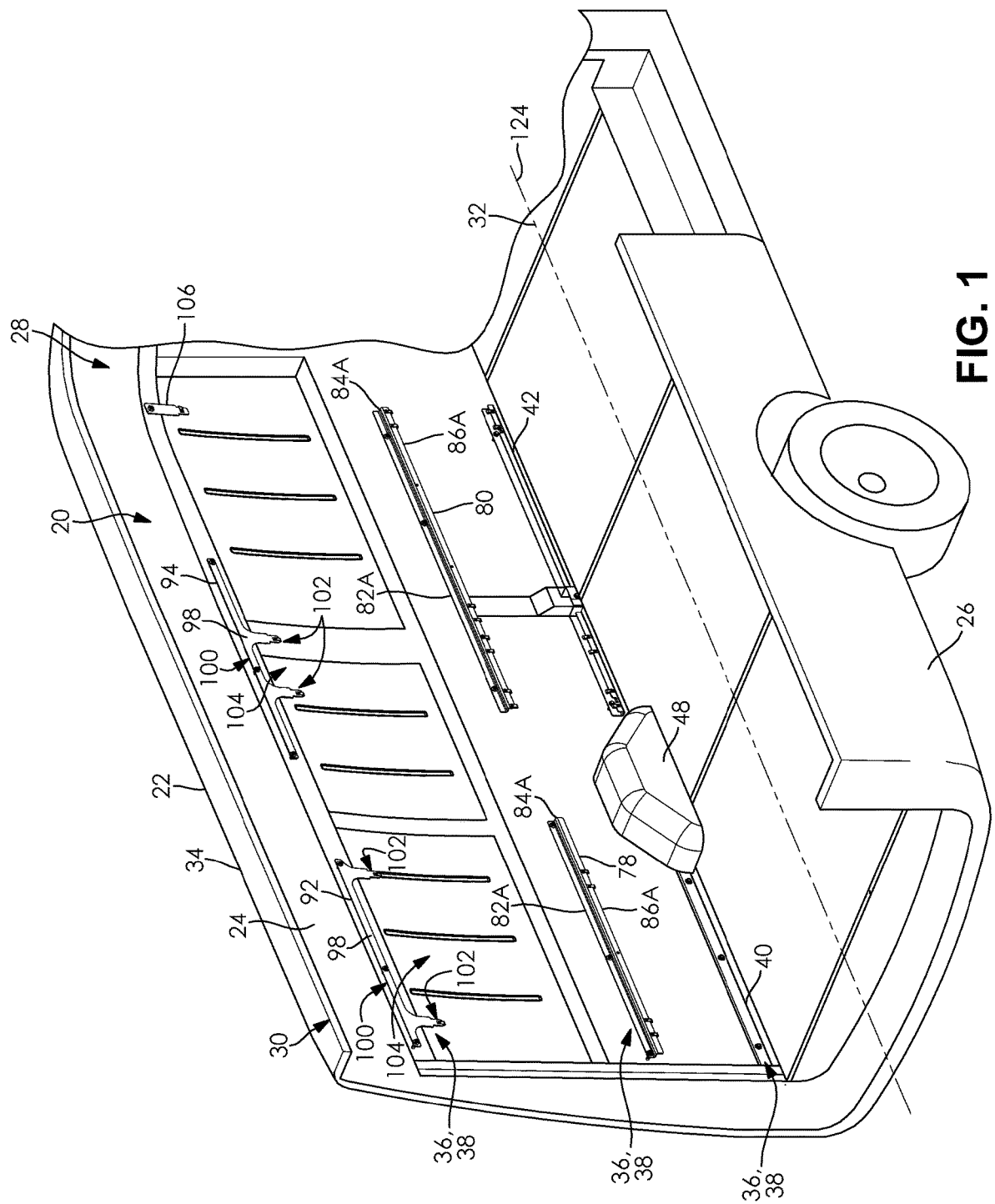
FIG. 1 depicts a rear perspective, schematic view of a partial cut away showing one embodiment of an interior of a vehicle.
Figure 2:
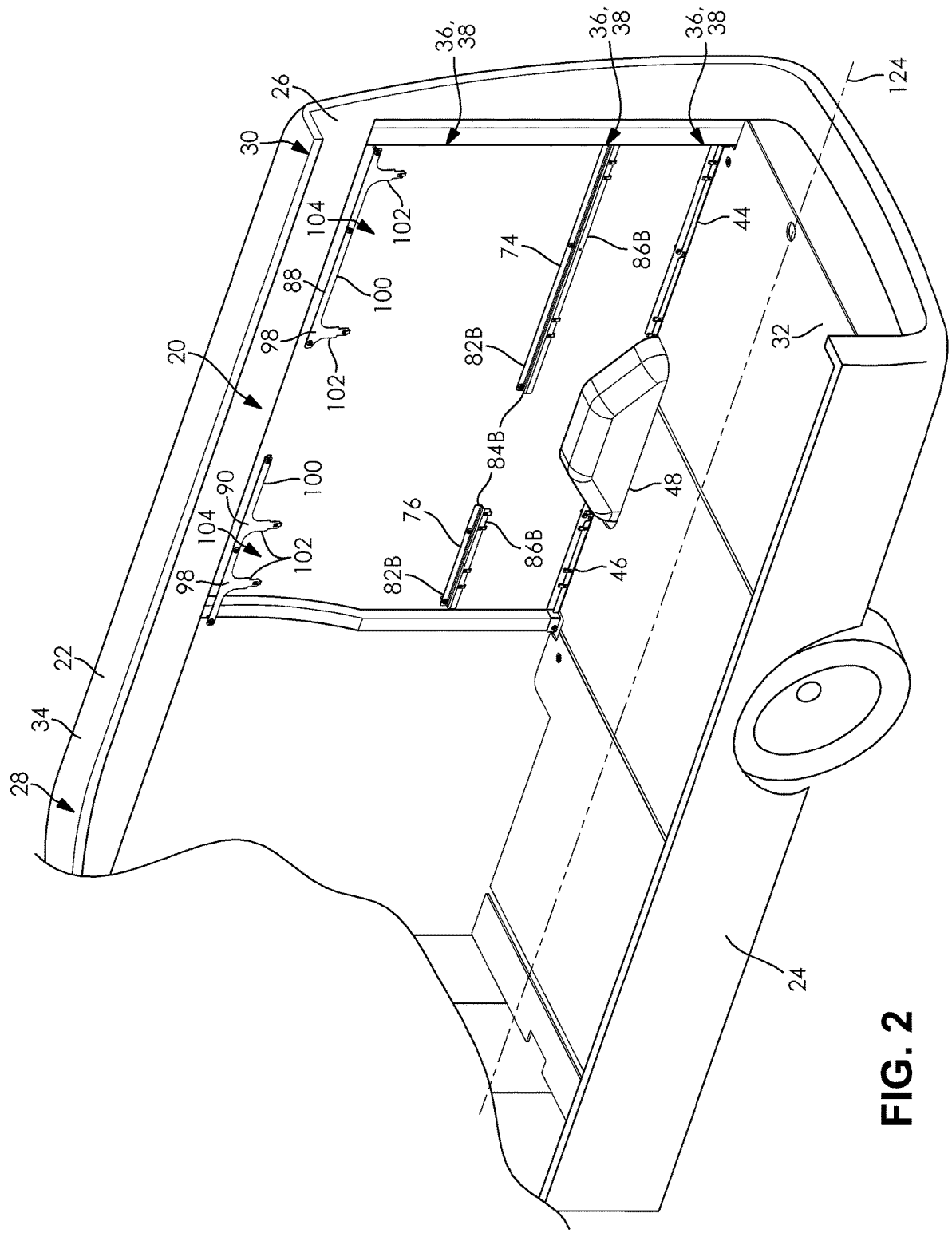
FIG. 2 depicts a rear perspective, schematic view of a partial cut away showing one embodiment of an interior of a vehicle.

Turning to FIGS. 1 and 2, one embodiment of a partial cargo area 20 for a vehicle 22 is schematically depicted. The vehicle 22 may be such as a cargo van, but other vehicles with other cargo areas of various shapes and sizes may be used.

The cargo area 20 is typically defined by at least two side walls 24, 26, a forward portion 28 and a rear portion 30. The forward portion 28 may be adjacent a driver's compartment (not shown). The driver's compartment may be separated from the cargo area 20 by the driver and passenger seats or a partition may separate the cargo area 20 from the driver's compartment. The rear portion 30 may be defined by doors or a wall (not shown).

The side walls 24, 26 extend from a floor 32 to a ceiling 34 of the vehicle 22. In some cases, the side walls 24, 26 are comprised of a plurality of panels and/or pillars. The panels and pillars add strength and shape to the side walls 24, 26 in specific locations. A vehicle shelf system 36 described and depicted herein is designed to work with the existing panels and pillars without any modification to their size, shape, location or structural integrity.

The side walls 24, 26 may be generally parallel one another, but they may or may not be the same length as one another. Instead, as shown in the depicted embodiment, the side wall 24 on the driver's side of the vehicle 22 is longer than the side wall 26 on the passenger's side of the vehicle 22. In this case, the side wall 26 on the passenger's side may accommodate a sliding or hinged door(s).

Figure 3:
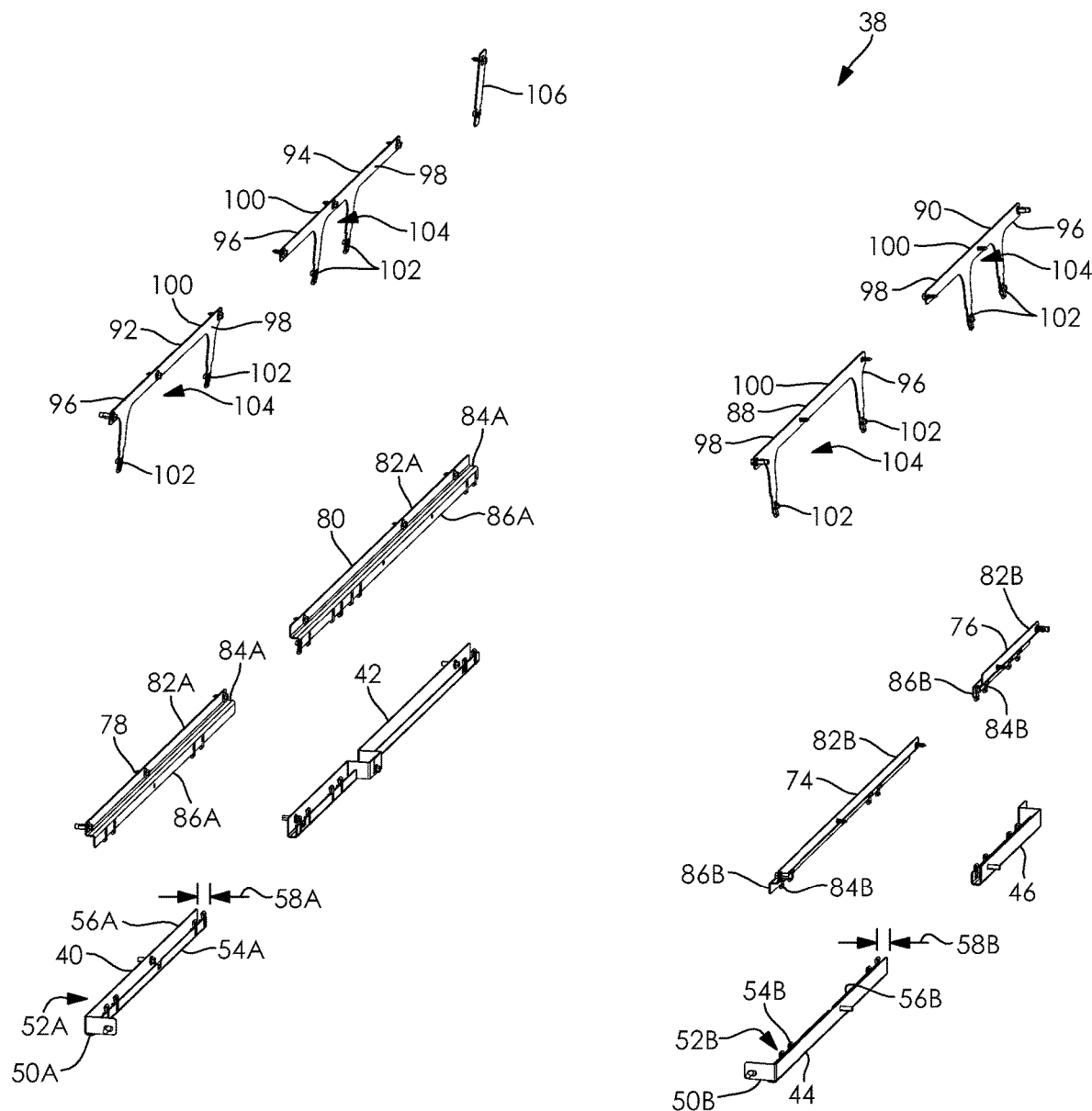
FIG. 3 depicts a perspective, schematic view of one embodiment of sub-frame components.

The vehicle shelf system 36 may comprise a sub-frame 38. The sub-frame 38 may be comprised of a plurality of components. FIG. 3 depicts one embodiment of the sub-frame components, while FIGS. 1-2 depict those components installed on the exemplary vehicle 22.

The sub-frame components may comprise one or more floor rails. For example, there may be one or more driver's side floor rails, which are best seen in one installed location in FIG. 1. There may also be one or more passenger side floor rails, which are best seen in one installed location in FIG. 2.

Turning first to the driver's side floor rails shown in FIGS. 1 and 3, there may be a rear driver's side floor rail 40 and a forward driver's side floor rail 42. As shown in FIG. 1, these rails 40, 42 may be installed at the intersection of the vehicle floor 32 and driver's side side wall 24. In the depicted embodiment, the rails 40, 42 may be installed on the side wall 24 with one more mechanical fasteners.

FIGS. 2 and 3 depict a rear passenger's side floor rail 44 and a forward passenger's side floor rail 46. As shown in FIG. 1, these rails 44, 46 may be installed at the intersection of the vehicle floor 32 and passenger's side side wall 26. In the depicted embodiment, the rails 44, 46 may be installed on the side wall 26 with one more mechanical fasteners.

In the depicted embodiment, the rails 40, 42, 44, 46 may extend substantially along the length of the driver's and passenger's side wall 24, 26 and conform thereto. Thus, the rails 40, 42, 44, 46 may extend from the rear portion 30 of the cargo area 20 to the forward portion 28 of the cargo area 20. The rails 40, 42, 44, 46 may be separated by a vehicle wheel well 48.

The rear floor rails 40, 44 may have a transverse foot 50A, 50B at end portions 52A, 52B thereof. The feet 50A, 50B may secure to pillars on the vehicle 22, such as the rearmost pillar in the cargo area 20.

The rear floor rails 40, 44 may have a generally U-shaped cross section defined by an inner lip 54A, 54B separated by an outer lip 56A, 56B by an offset 58A, 58B. The offset 58A, 58B may be used to locate the outer lip 56A, 56B a predetermined distance from the side wall 24, 26 and its associated structure. In other words, the offset 58A, 58B may be dimensioned to locate the outer lip 56A, 56B in a plane in which nothing from the side wall 24, 26 interferes (except for the system components noted below). This plane will be referred to as the upright member plane 60A, 60B. The outer lip 56A, 56B will receive additional structure from the system 36 described below.

FIGS. 1-3 also depict driver's side and passenger side mid-rails, which may also be part of the sub-frame components. The mid-rails may be secured to the side walls 24, 26, such as through mechanical fasteners, above the floor rails. Preferably, the mid-rails on the driver's side side wall 24 are vertically aligned with, and in the same vertical plane as, the mid-rails on the passenger's side side wall 26.

FIGS. 2 and 3 depict a rear passenger's side mid-rail 74 and a forward passenger's side mid-rail 76. Similarly, FIGS. 1 and 3 depict a rear driver's side mid-rail 78 and a forward driver's side mid-rail 80.

In the depicted embodiment, the rails 74, 76, 78, 80 may extend substantially along the length of the driver's and passenger's side walls 24, 26 and conform thereto. Thus, the rails 74, 76, 78, 80 may extend from the rear portion 30 of the cargo area 20 to the forward portion 28 of the cargo area 20.

One or more of the mid-rails 74, 76, 78, 80 may each have a Z-shaped cross section. The Z-shape may result from an upstanding flange 82A, 82B, a mid-span flange 84A, 84B and a downstanding flange 86A, 86B. The upstanding flange 82A, 82B may be secured to the side walls 24, 26 through mechanical fasteners; the upstanding flange 82A, 82B may extend parallel the side walls 24, 26. The mid-span flange 84A, 84B extends the downstanding flange 86A, 86B a predetermined distance from the side walls 24, 26; the mid-span flange 84A, 84B may extend transverse the side walls 24, 26. In a preferred embodiment, the mid-span 84A, 84B extends the downstanding flange 86A, 86B to the upright member plane 60A, 60B; the downstanding flange 86A, 86B may be parallel the side walls 24, 26 and the upstanding flange 82A, 82B. The downstanding flange 86A, 86B is thus co-planar with the outer lip 56A, 56B but vertically spaced from the outer lip 56A, 56B.

In the depicted embodiment, the mid-span rails 74, 76, 78, 80 may extend substantially along the length of the driver's side wall 24 and the passenger's side wall 26 and conform thereto. Thus, the rails 74, 76, 78, 80 may extend from the rear portion 30 of the cargo area 20 to the forward portion 28 of the cargo area 20.

FIGS. 1-3 also depict driver's side and passenger side upper rails, which may also comprise the sub-frame 38 components. The upper rails may be secured to the side walls 24, 26, such as through mechanical fasteners, above the mid-rails 74, 76, 78, 80. Preferably, the upper rails on the driver's side are vertically aligned with, and in the same vertical plane as, the upper rails on the passenger's side.

FIGS. 2 and 3 depict a rear passenger's side upper rail 88 and a forward passenger's side upper rail 90. Similarly, FIGS. 1 and 3 depict a rear driver's side upper rail 92 and a forward driver's side upper rail 94.

In the depicted embodiment, the rails 88, 90, 92, 94 may extend substantially along the length of the driver's and passenger's side walls 24, 26 and conform thereto. Thus, the rails 88, 90, 92, 94 may extend from the rear portion 30 of the cargo area 20 to the forward portion 28 of the cargo area 20.

The upper rails 88, 90, 92, 94 may be plate-like members with inner and outer sides 96, 98 that define a substantially constant thickness therebetween. The upper rails 88, 90, 92, 94 may have longitudinal portions 100 with transverse portions 102 extending therefrom. The transverse portions 102 may extend vertically toward the mid-rails 74, 76, 78, 80. The transverse portions 102 may be separated from one another by gaps 104 created by the longitudinal portions 100.

Preferably, the upper rails 88, 90, 92, 94 reside primarily in the upright member plane 60. Thus, they are coplanar with the downstanding flange 86A, 86B and the outer lip 56A, 56B.

In the depicted embodiment, the upper rails may also be comprised of a single transverse member 106. The single transverse member 106 may not have a longitudinal component or if it has a longitudinal component, it has a length much less than the height of the transverse member 106.

The floor rails 40, 42, 44, 46, mid-rails 74, 76, 78, 90 and upper rails 88, 90, 92, 94 may be each unitary, integrally formed and one piece. In a preferred embodiment, the rails (40, 42, 44, 46, 74, 76, 78, 80, 88, 90, 92, 94) may be constructed of metal, such as stainless steel, or an aluminum alloy.

Figure 4:
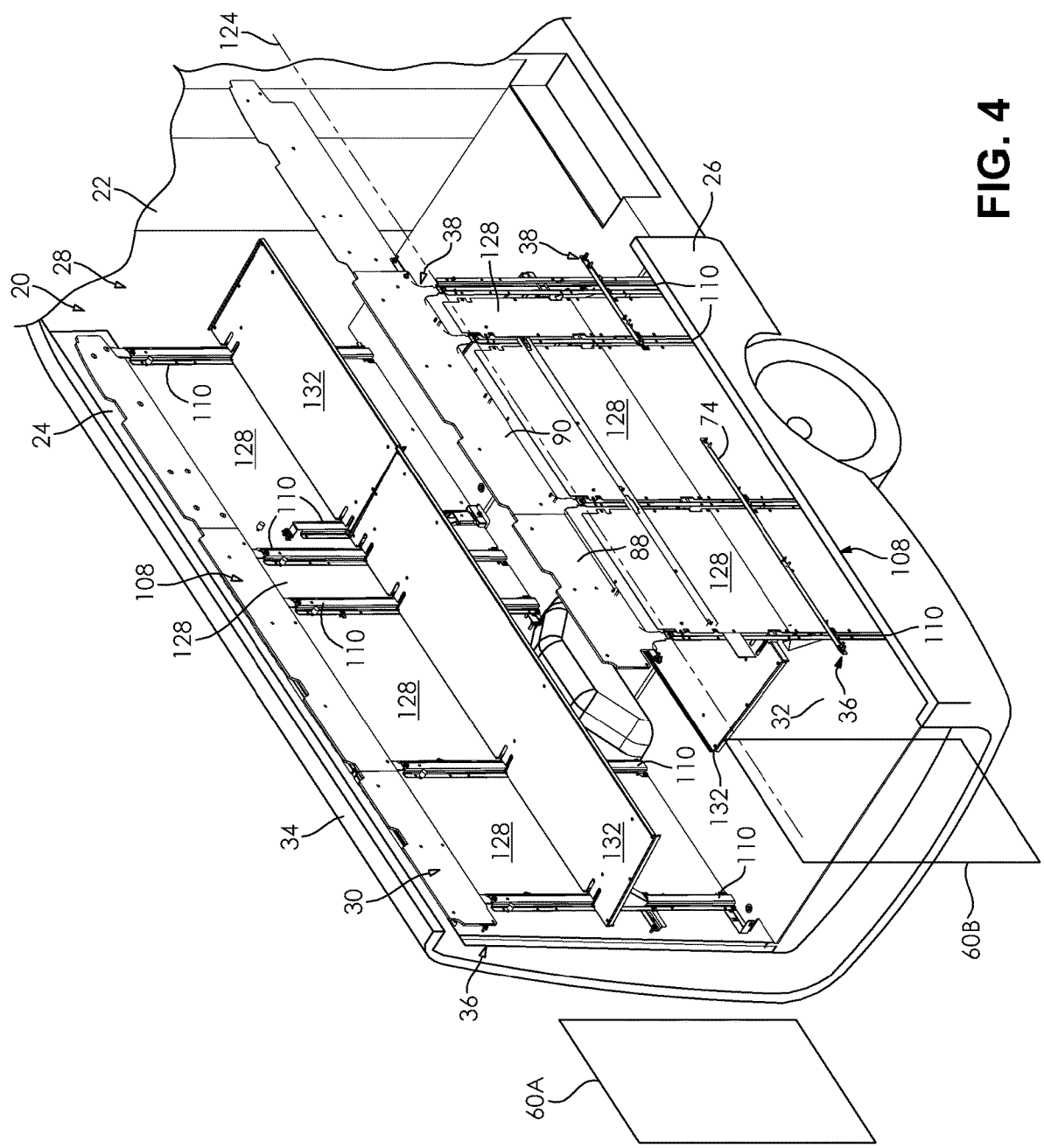
FIG. 4 depicts a rear perspective, schematic view of a partial cut away showing one embodiment of an interior of a vehicle.

The system 36 may also be comprised of a frame system 108, which can be seen at least in FIG. 4. The frame system 108 may be comprised of at least one upright member 110. The upright member 110 may be such as a single piece of stamped metal, but it may also be comprised of multiple pieces that are connected together. The upright member 110 may have a central flange 112 bounded by two side flanges 114. The side flanges 114 may be the same as one another or different. The central flange 112 and the side flanges 114 may extend the length of the upright member 110. The side flanges 114 may be coplanar with one another but the central flange 112 may not be coplanar with the side flanges 114. In one embodiment, a backside 116 of the upright member 110 may define a void space 118 created by the central flange 112 being offset from the side flanges 114. In the same embodiment, the central flange 112 may be at least as wide as the individual side flanges 114.

FIG. 4 depicts the shelf system 36 utilizing a plurality of upright members 110 that are spaced apart from one another on both the driver's side side wall 24 and the passenger side side wall 26 of the vehicle 22. The upright members 110 may be the same as one another, or they may be different. In any case, they may all be part of the frame system 108.

Figure 5:
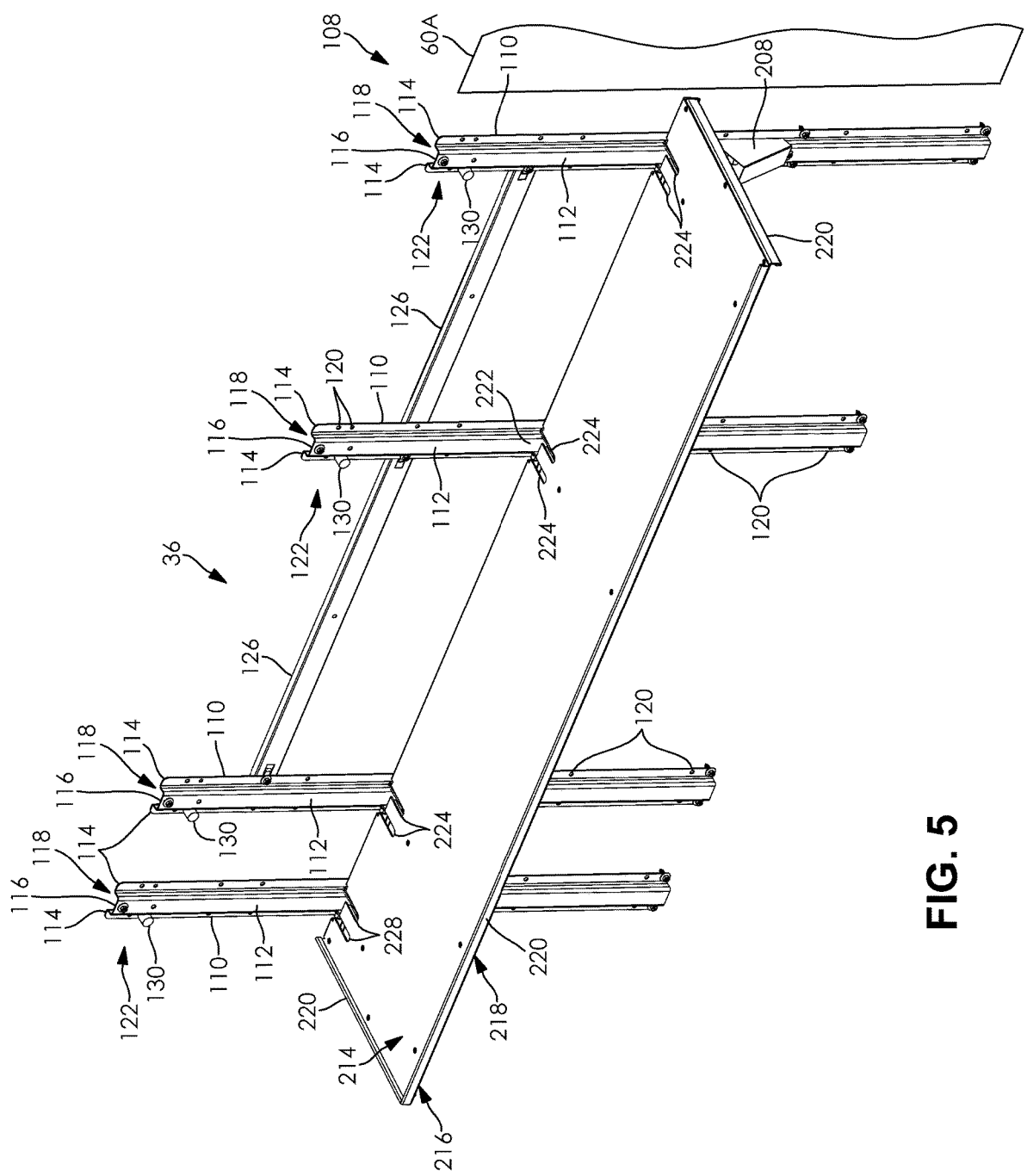
FIG. 5 depicts a perspective, schematic view of one embodiment of a shelf system.
Figure 6:
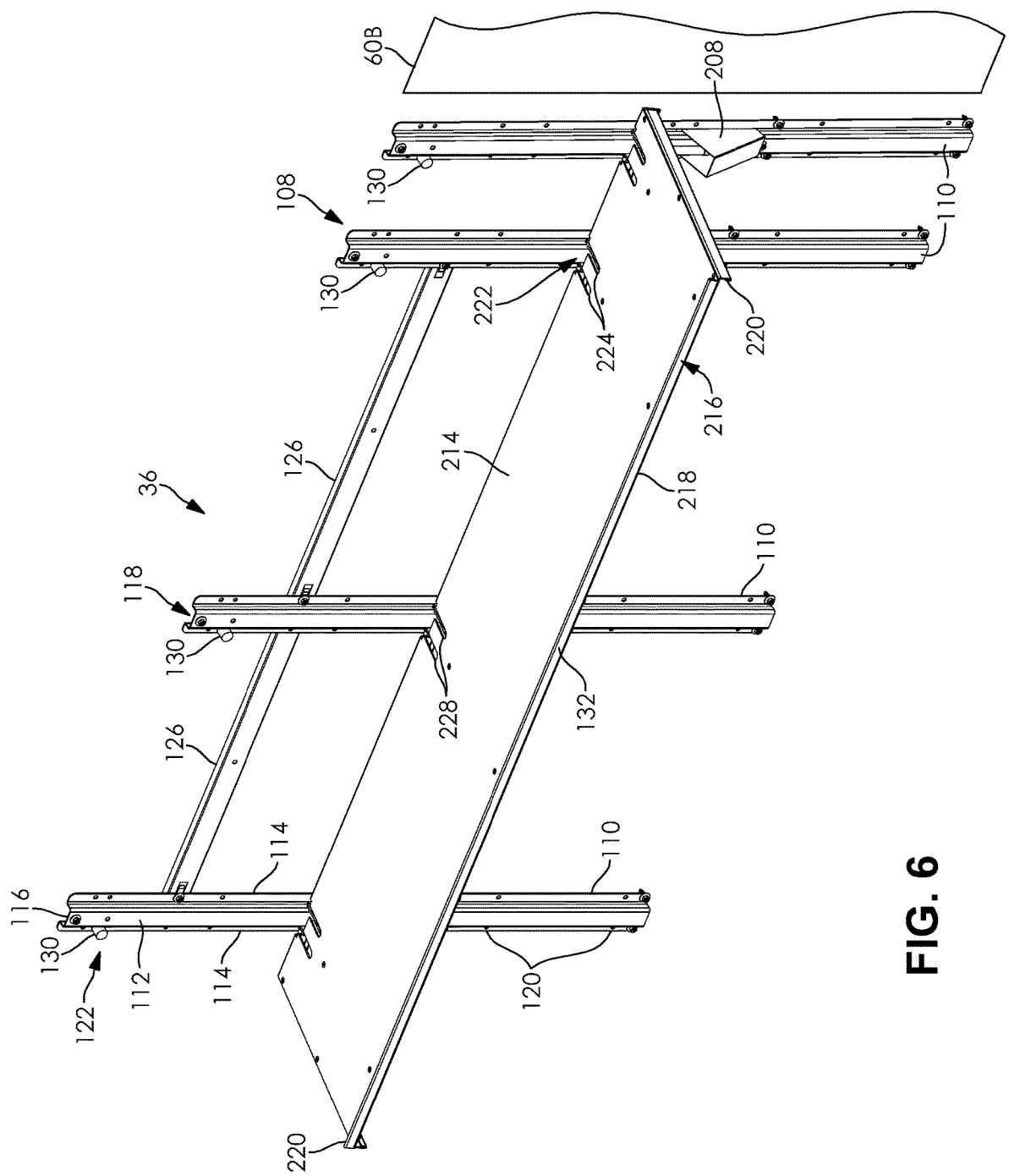
FIG. 6 depicts a perspective, schematic view of one embodiment of a shelf system.
Figure 7:
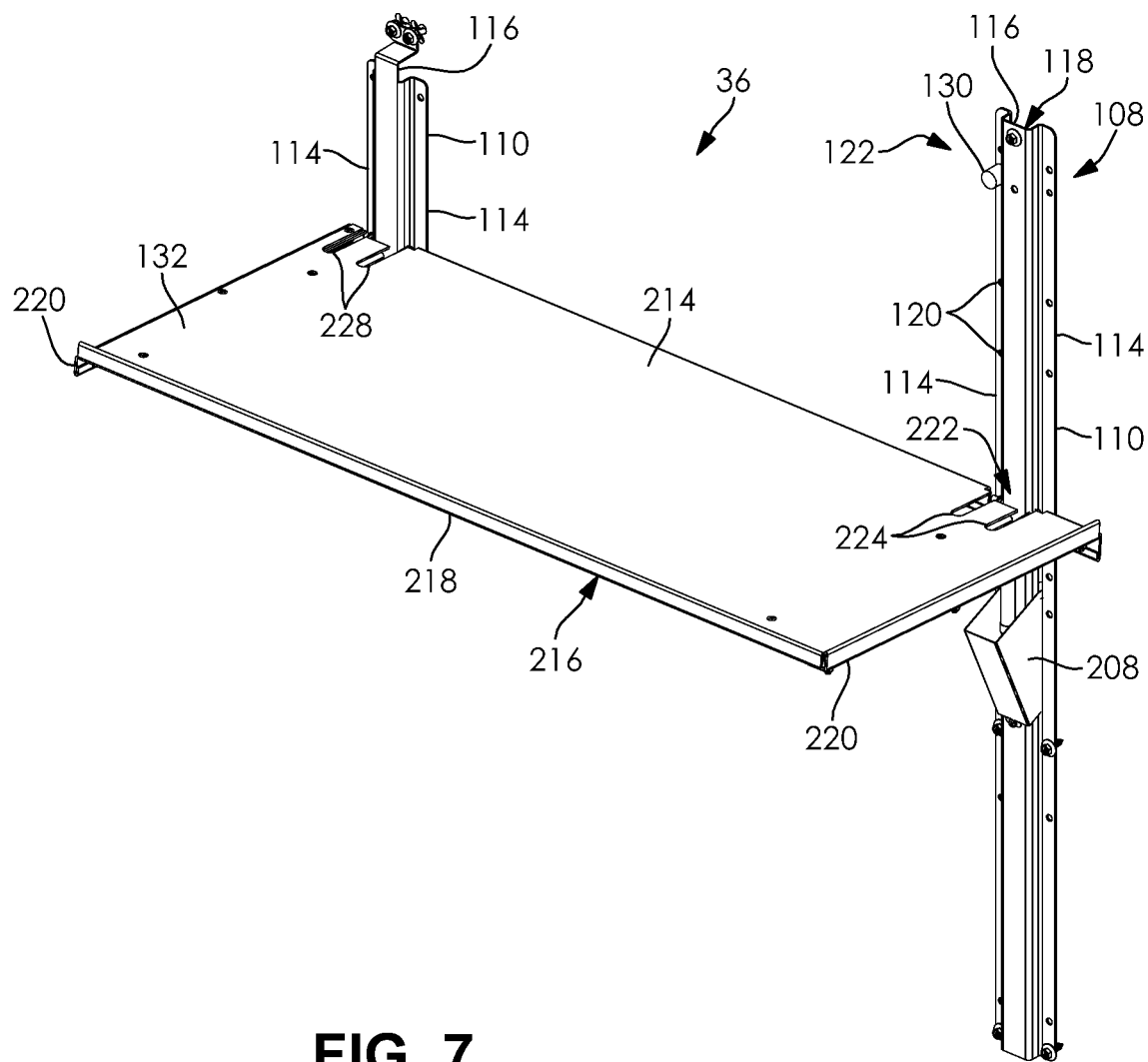
FIG. 7 depicts a perspective, schematic view of one embodiment of a shelf system.

FIGS. 5, 6 and 7 depict the upright members 110 from FIG. 4. From these figures, as well as others herein, it can be appreciated that the two upright members 110 may have a plurality of apertures 120. The apertures 120 may be located in the side flanges 114 as well as the central flanges 112. The apertures 120 may accommodate mechanical fasteners that connect the upright members 110 with the floor, mid-span and upper rails 40, 42, 44, 46, 74, 76, 78, 80, 88, 90, 92, 94. More particularly, mechanical fasteners may be located through the side flanges 114 of the upright members 110 and into the outer lip 56A, 56B and the downstanding flange 86A, 86B of the floor and mid-span rails 40, 42, 44, 46, 76, 78, 80, 82, respectively.

In one embodiment, the transverse portions 102 of the upper rails 88, 90, 92, 94 may be located in an upper portion 122 of the void space 118 of the upright members 110. One or more mechanical fasteners may be located through the upright members 110 and the transverse portions 102 to secure them together.

By securing the upright members 110 to the sub-frame members 38 in this manner, the upright members 110 are mounted in the vehicle 22 in a single plane, which is the upright member plane 60 introduced above. Thus, the system 36 comprises a driver's side upright member plane 60A and a passenger side upright member plane 60B, which are parallel one another along the length of the side walls 24, 26 as well as a longitudinal axis 124 of the vehicle 22. From the above, it is also clear that the sub-frame 38 and the frame system 108 may be connected together.

As best seen in FIGS. 5 and 6, one or more cross-pieces 126 may connect the upright members 110 together. The cross-pieces 126 may be part of the frame system 108. The cross-pieces 126 may extend at an angle, such as transverse, the primary direction of the upright members 110. In the depicted embodiment, the cross-pieces 126 are co-planar with one another, however, the location of the cross-pieces 126 may be anywhere along the vertical height of the upright members 110. Further, more than one cross-piece 126 may be used to span between upright members 110.

A plurality of panels 128 may be located between the upright members 110. The panels 128 may be sized and shaped to fit between the upright members 110, which are located at various distances from one another.

Preferably, the panels 128 are each constructed of metal, such as steel, but they may be plastic, wood, fiberglass, and/or composite materials. The panels 128 may all be generally planar and of a constant thickness. The panels 128 may have fastener apertures (not shown) on their edge portions to receive fasteners that extend through them and into the side flanges 114 of the upright members 110. The fasteners thus secure to the panels 128 to the upright members 110.

All of the panels 128 are preferably located in the upright member plane 60A, 60B. As a result, they, along with the upright members 110 in the plane 60A, 60B, close off the side walls 24, 26 of the vehicle 22 and they form a barrier against which materials can be stacked against or located/stored thereon. The panels 128 also create a substantially continuous surface that provides the vehicle 22 with an aesthetically pleasing finished surface that hides the structure of the side walls 24, 26 and components, as well as portions of the frame 108 and sub-frame 38.

Bumpers 130 may be used on the shelf system 36, such as on the upright members 110 and/or a shelf member 132. In the embodiments depicted in FIGS. 5-11, a plurality of bumpers 130 may be located on the side flanges 114 of the upright members 110. The bumpers 130 may be connected to the side flanges 114 such as with mechanical type fasteners through the apertures 120 in the side flanges 114. The bumpers 130 may be constructed of a resilient material, such as, but not limited to a rubber compound. While bumpers 130 of a circular cross-section are shown, bumpers 130 of other sizes, shapes and locations on the upright members 110 may be used. The bumpers 130 protect the upright members 110 and the shelf member 132 from contact with one another, and absorb noise and vibration.

As best seen in FIGS. 8-11, a first end 134 of a biasing member 136 may be connected to an upright member 110. In the depicted embodiment, the first end 134 of the biasing member 136 may be attached to the central flange 112 of the upright member 110. The connection may be such as a ball stud 138 that is directly attached to the central flange 112 without any intervening structure. By directly attached, it meant that the stud portion 140 of the ball stud 138 is located in an aperture 142 of the central flange 112.

The biasing member 136 may be comprised of a socket 144 that receives the ball stud 138 therein. The ball stud 138 and socket 144 design permits the socket 144, and thus the biasing member 136, to rotate with respect to the ball stud 138, which is advantageous for aligning the two during installation and permitting relative movement between the two during operation. Preferably, the ball stud 138 and socket 144 connection is the only connection between the first end 134 of the biasing member 136 and the upright member 110.

As noted above, the ball stud 138 and socket 140 may permit relative rotation, but there is no axial translation via this connection. The lack of axial translation at the connection is an advantage that reduces complexity, and thus cost, and it eliminates failure modes, as well as pinch points.

Figure 11:
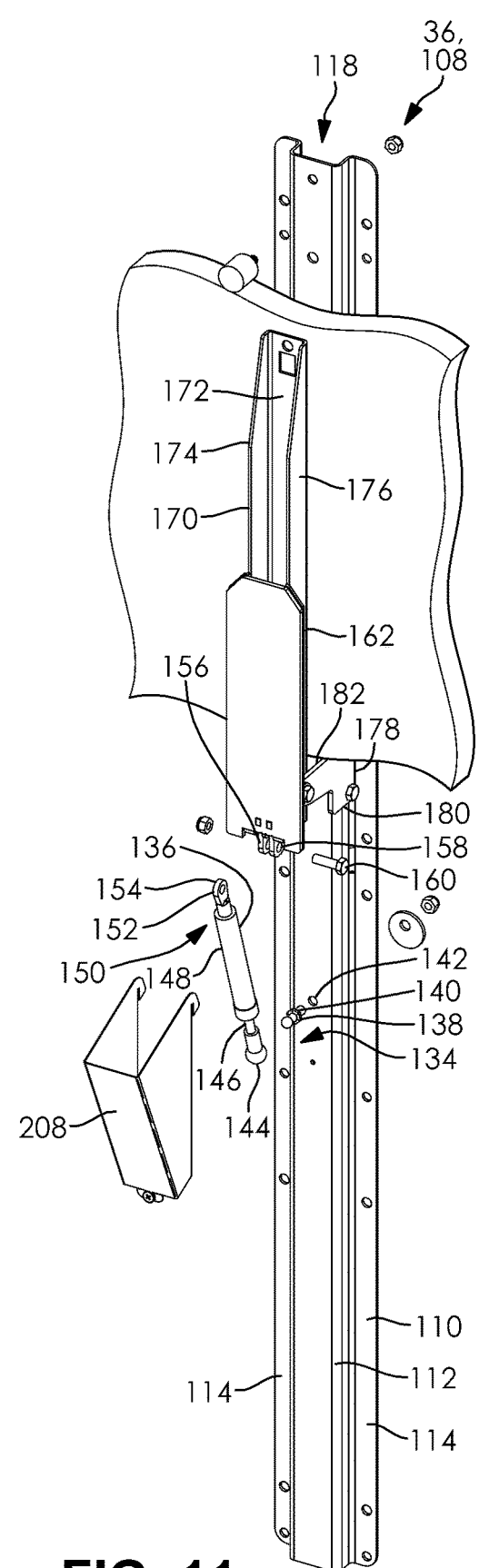
FIG. 11 depicts a perspective, schematic view of one embodiment of an exploded shelf system.

The socket 140 may be connected to a piston rod 146, which extends to a piston (not shown) located within a piston housing 148. A second end 150 of the biasing member 136, which comprises the end of the piston housing 148 opposite the piston rod 146, comprises a flat 152, such as a flat flange member, with an aperture 154 therethrough, as shown in FIG. 11. The flat 152 fits between two mounting ears 156, which are also shown in FIG. 11, which have aligned apertures 158 therethrough. The flat aperture 154 and the mounting ear apertures 158 are aligned and a fastener 160 is located therethrough to connect the biasing member 136 with the mounting ears 156.

The flat/fastener/mounting ear 152/160/156 connection permits pivotal motion between the flat 152 and the mounting ear 156, but there is no axial translation via this connection. The lack of axial translation at the connection is an advantage that reduces complexity and thus cost, eliminates failure modes, as well as pinch points, and maintains the shelf member 132 in close proximity to the upright member 110 which reduces its operational profile.

The biasing member 136 may extend at an angle to connect to the upright member 110 and the mounting ears 156; as can be appreciated from the discussion below, this angle may vary depending on the condition of the shelf member 132.

Figure 10:
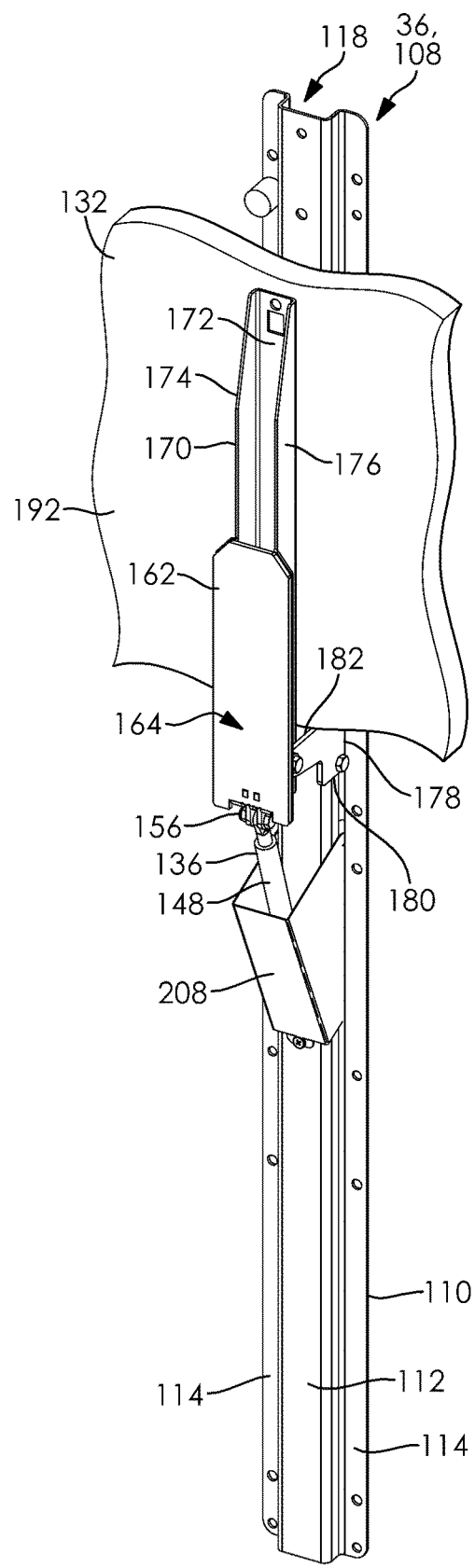
FIG. 10 depicts a perspective, schematic view of one embodiment of an assembled shelf system.

In one embodiment, best seen in FIGS. 10 and 11, where a shelf member 132 is in a raised/stowed position, the biasing member 136 is non-parallel to the upright member 110 it is connected to. The angle the piston rod 146 and piston housing 148 makes with the upright member 110 may be such as an acute angle. However, as shown in FIGS. 8 and 9, when the shelf member 132 is in a lowered/deployed position, the biasing member 136 pivots toward the upright member 110, which reduces the acute angle. In some embodiments, the biasing member 136 may be parallel the upright member 110 when the shelf member 132 is the lowered/deployed position.

FIGS. 8-11 also depict that the length of the biasing member 136 changes as the shelf member 132 moves from the raised/stowed position to the lowered/deployed position. Simultaneously, as the length of the biasing member 136 changes, the angle of the biasing member 136 with respect to the stationary upright member 110 when pivoting the shelf member 132 between the raised position and the lowered position changes.

The shelf system 36 may use one or more biasing members 136 connected as described above. In some embodiments, only a single biasing member 136 connects a single upright member 110 with a shelf member 132. The shelf system 36 advantageously does not require additional springs, pistons, motors or other movement devices to enable a user to raise or lower it. This reduces complexity, weight, pinch points and cost in the shelf system 36 compared to the prior art.

The mounting ears 156 are part of a mounting plate 162, which may be appreciated from the embodiment in FIGS. 10 and 11. The mounting ears 156 may be integrally formed, one-piece and integral with the mounting plate 162, but they may also be separately formed and attached to the mounting plate 162 such as by welding or mechanical fasteners.

The mounting ears 156 may be at a first end portion 164 of the mounting plate 162. The mounting plate 162 may be substantially planar, except for the mounting ears 156. Thus, the mounting plate 162 may have a first planar side 166 and a second planar side 168 separated by a constant thickness. The mounting plate 16 may also have a generally rectangular perimeter. The mounting plate 162 may be secured to the shelf system 36 such as with mechanical fasteners and/or welding.

In one embodiment, the mounting plates 162 separately connect with under-shelf brackets 170. The mounting plates 162 are fixed and stationary with respect to the under-shelf brackets 170. In this embodiment, the under-shelf brackets 170 each have a central flange portion 172 and at least one rib portion. Preferably, there are two rib portions 174, 176 for each under-shelf bracket 170. The rib portions 174, 176 each extend substantially parallel one another and transverse the central flange portion 112.

Spanner brackets 178 may be used to connect the rib portions 174, 176 of each under-shelf bracket 170 with the upright members 110, as shown in FIGS. 8-11. In one embodiment, a first leg 180 of the spanner bracket 178 may be secured to a rib portion 174, while a second leg 182 of the spanner bracket 178 is secured to the upright member 110. The spanner brackets 178 extend parallel but are located offset from the rib portions 174, 176. Preferably, a spanner bracket 178 is connected to both of the rib portions 174, 176, and thus the upright member 110.

The first leg 180 may be connected to a rib portion 174, 176 with a bushing 184. The bushing 184 permits relative rotation of the rib portion 174, 176 to the fixed and stationary spanner bracket 178. The motion permitted by the bushing 184 is in a single vertical plane. The bushing 184 extends through the rib portion 174, 176 and the first leg 180 of the spanner bracket 178 above where the mounting plate 162 contacts the rib portion 174, 176. The second leg 182 of the spanner bracket 178 may be secured to the upright member 110 such as with mechanical fasteners 186.

A pivot fastener 188, such as a carriage type bolt, may be located through the bushing 184 and each second leg 182 of the two spanner brackets 178. A nut 190 on the end of the pivot fastener 188 axially secures it in place. Thus, the pivot fastener 188 does not rotate, pivot or move axially or radially in the bushing 184.

A single pivot fastener 188 at each bushing 184 has been found to be adequate to support the shelf member 132, which is advantageous over the prior art, at least in terms of cost and simplicity, as the prior art is known to use multiple fastener connections for attachment between a shelf and a support structure for the shelf.

The central flange portion 172 of the under-shelf bracket 170 may be secured directly to a lower surface 192 of the shelf member 132, such as with mechanical fasteners. As can be appreciated from FIGS. 5-7, the upright members 110 may be located at varying distances with respect to one another. These varying distances locate the under-shelf brackets 170 at varying distances from one another on the lower surface 192 of the shelf member 132.

Figure 14:
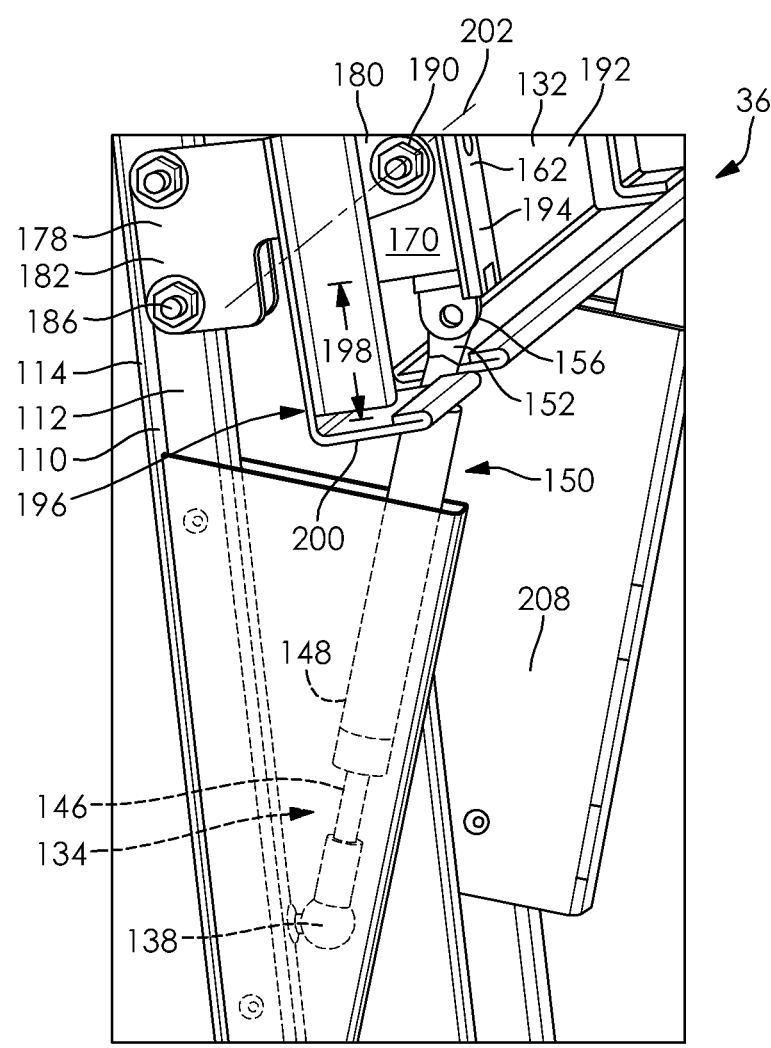
FIG. 14 depicts a perspective, schematic view of one aspect of the shelf system.

In one embodiment shown in FIG. 14, an inboard end portion 194 of the rib portion 174, 176 of the under-shelf bracket 170 terminates before it reaches a back edge portion 196 of the shelf member 132. In this embodiment, there is a gap 198 between the end portion 194 of the rib portion 174, 176 and the back edge portion 196 of the shelf member 132. The back edge portion 196 may have a lip 200. In either case, it is preferred that there is a gap 198 between the back edge portion 196 whether it comprises a lip 200 or simply the end of the shelf member 132. The gap 198 provides space for the rib portion 174, 176 when the shelf member 132 is in the lowered/deployed position and the gap 198 accommodates the flat 152 and mounting ear 156 connections.

The pivot fastener 188 is thus located outwardly from the end portion 194 of the rib portion 174, 176. As a result, the pivot axis 202 of the shelf member 132 is not located at the end portion 194 of the rib portion 174, 176, but rather outboard on the rib portion 174, 176 by a predefined distance.

The spanner bracket 178 also facilitates the location of the pivot axis 202 for the shelf member 132. In one embodiment, the first leg 180 of each spanner bracket 178 extends the pivot axis 202 away from the upright member 110 by the length of the first leg 180. By locating the pivot fastener 188 through an aperture 204 in an end portion 206 of the first leg 180, which overlaps with the inboard end portion 194 of the rib portion 174, 176, the pivot axis 202 is extended to a location outboard on the rib portion 174, 176 from the end of the rib portion 174, 176.

In the depicted embodiment, the connection order in the lateral direction along the under-shelf bracket 170 is that the flat 152 on the biasing member 136 connects with the mounting ears 156 of the mounting plate 162 at the inboard end portion 194 of the rib portion 174, 176. Outboard along the under-shelf bracket 170 from the flat/mounting ear 152, 156 connection is the pivot axis 202 of the shelf member 132. As noted above, there is a length of under-shelf bracket 170 that extends from the flat/mounting ear 152, 156 connection to the pivot axis 202.

In some embodiments, a cover 208 may be located at least partially over each biasing member 136. The biasing member 136 does not connect with the cover 208 and the cover 208 serves no function to the biasing member 136 in terms of support to, or connection with, the upright member 110. Instead, the cover 208 is designed to keep items in the vehicle 22 and items, such as the operator and the operator's clothing, from becoming entangled with the biasing member 136, or any of the associated connections therewith.

The cover 208 may have two parallel sides 210 and a middle portion 212 located between the sides 210 that is connected to both sides 210. In the depicted embodiment, the sides 210 may be located on the upright member 110 via male/female fittings, such as hooks on the sides 210 that engage with slots on the upright member 110. Additionally, or alternatively, the sides 210 may be connected to the central flange 112 or the side flange 114 of the upright member 110 with mechanical fasteners. The middle portion 212 may be angled so that it extends non-parallel to the central flange 112 of the upright member 110. The angled nature of the middle portion 212 accommodates the motion of the biasing member 136 as it moves as the shelf member 132 raises and lowers.

As shown in FIGS. 4-7, the shelf system 36 may comprise the shelf member 132 as well. In one embodiment, the shelf member 132 may have an upper surface 214 and a lower surface 192 that may define a substantially constant thickness between them. A perimeter 216 at the ends of the upper and lower surfaces 214, 192 may define a rectangular type shape of the shelf member 132. As can be appreciated from these figures, the shelf members 132 may be various sizes. Further, while generally rectangular shelf members 132 are shown, shelf members 132 of other shapes are permissible, as long as they work with the above-mentioned systems.

Edge portions 218 of each shelf member 132 define the boundary of the upper and lower surfaces 214, 192. The edge portions 218 may be comprised of upstanding or down-standing lengths of material 220 that may extend along one or more edge portions 218. In some embodiments, the lengths of material 220 may be helpful in preventing materials located on the upper surface 214 from falling off the upper surface 214.

As noted above, the general shape of the shelf member 132 may be such as rectangular. As shown in FIGS. 4-7, a back edge portion 196 of the shelf member 132 may have some deviations from being entirely straight. For example, the back edge portion 196 may have one or more upright member recesses 222 in selected locations. Each upright member recess 222 may accommodate at least a portion of an adjacent upright member 110. The exemplary embodiments in the figures depict upright member recesses 222 in the back edge portion 196 that extend at least the width of the adjacent upright member 110. The depth of each upright member recess may accommodate at least a portion of the adjacent upright members 110. In one embodiment, the depth of each upright member recess 222 may accommodate at least a portion of the central flange 112 of the adjacent upright member 110. As can be appreciated from the figures, when the shelf member 132 is located in a lowered position, at least a portion of the central flange 112 can be accommodated within the upright member recess 222. This permits the back edge portion 196 of the shelf member 132 to be located as close to the upright member 110 and the side wall 24, 26 of the vehicle 22 as possible. By being located close to the side wall 24, 26, the shelf system 36 intrudes less into the cargo area 20 in both a raised, as well as a lowered, position. Further, any gap that exists between the back edge portion 196 and the side wall 24, 26 is minimized, which reduces the likelihood that items on the shelf member 132 can fall between the back edge portion 196 and the wall 24, 26.

In addition, one or more spanner bracket recesses 224 may be located in the shelf member 132 in each upright member recess 222. As shown in FIGS. 4-7, two spanner bracket recesses 224 may be located in the shelf member 132 in each upright member recess 222. In the depicted embodiment, the spanner bracket recesses 224 may extend from the upright member recesses 222 into the shelf member 132. The spanner bracket recesses 224 may be parallel one another and may be aligned with the respective edges of the central flange 112 of the upright members 110.

The spanner bracket recesses 224 may receive at least a portion of the respective spanner brackets 178 they are aligned with when the shelf member 132 is in the raised position. This can be appreciated in FIGS. 10 and 11 where the first leg 180 of the spanner bracket 178 extends perpendicularly to the under shelf bracket 170. The spanner bracket recesses 224 in the shelf member 132 accommodate the extending spanner brackets 178.

In one embodiment, the spanner bracket recesses 224 may receive upper portions 226 of each spanner bracket 178 when the shelf member 132 is in the lowered position. In these instances, it may be the upper portion 226 of the first leg 180 of the spanner bracket 178 that is received within the recesses 224. In that embodiment, the upper portions 226 of each spanner bracket 178 may be flush with the upper surface 214 of the shelf member 132. By being flush with the upper surface 214 of the shelf member 132, the upper portions 226 of each spanner bracket 178 functions to prevent items placed on the shelf member 132 from falling into the recesses 224. Preferably, the spanner bracket recesses 224 are wide enough that the spanner brackets 178 are received therein without contacting the walls 228 in the shelf member 132 that define the spanner bracket recesses 224.

In the embodiments depicted in FIGS. 4-7, the shelf member 132 may extend at an angle from the upright members 110 when the shelf member 132 is in a lowered position. The angle the upper surface 214 creates with the upright members 110 may be between 75-120 degrees. In a preferred embodiment, the angle may be such as less than 90 degrees so as to reduce the possibility that items located on the upper surface 214 of the shelf member 132 do not fall off the shelf member 132; instead, they become captured between the shelf member 132, the upright members 110 and the panels 128.

As can be appreciated from the above, in one embodiment the shelf member 132 is cantilevered from the upright members 110. Preferably, besides the structures mentioned above, the shelf member 132 is not further supported on the upright members 110, the vehicle side wall 24, 26, the vehicle ceiling 34 or floor 32. Thus, there are no support structures that attach to the upper or lower surfaces 214, 192 of the shelf member 132, and none that attach to the under-shelf brackets 170. Further, to reduce complexity and costs, no structures, except for the shelf member 132 itself, extend between the under-shelf brackets 170.

From FIG. 4, it can be appreciated that more than one shelf system 36 may be installed in a vehicle 22. Each of these shelf systems 36 may be as described above but they may each be of different dimensions and shapes. In some instances, a particular shelf system 36 may have two upright members 110, while in other instances, three upright members 110 may be used. Further, in some cases, the upright members 110 may be the same height or the height may be varied.

With reference now to FIGS. 12 and 13, as well as FIG. 4, it may be that some upright members 110 are not provided with a biasing member 136. Where a biasing member 136 may not be need, the shelf system 36 may be comprised of the same components except for the biasing member 136 and the cover 208.

In accordance with the provisions of the patent statutes, the device has been described in what is considered to represent its preferred embodiments. However, it should be noted that the device can be practiced otherwise than as specifically illustrated and described without departing from its spirit or scope.

What is claimed is:

1. A shelf system, comprising:
   at least one upright member;
   a biasing member having a first end and a second end, said first end directly attached to said upright member via a ball stud;
   a shelf member supported by an under-shelf bracket and adapted for pivotal motion with respect to said at least one upright member; and
   a spanner bracket having a first end portion connected said at least one upright member and a second end portion forming a pivot axis for said shelf member,
   wherein said second end of said biasing member is connected to a rear portion of the shelf member.

2. The shelf system of claim 1, further comprising a first and a second upright member, wherein each upright member is comprised of a central body flange bounded by two side flanges, wherein said side flanges are parallel one another but they are not coplanar with said central body flange, wherein said first and second upright members are spaced apart from one another.

3. The shelf system of claim 1, wherein said biasing member comprises
   a piston.

4. The shelf system of claim 1, wherein said second end of said biasing member has a flat with an aperture, said flat is received within two mounting ears, said ears each having apertures aligned with said aperture in said flat, wherein an ear fastener extends through the all of said apertures.

5. The shelf system of claim 4, wherein said mounting ears are formed on an end portion of a mounting plate, said mounting plate is connected to said under-shelf bracket.

6. The shelf system of claim 5, wherein said under-shelf bracket comprises two parallel ribs connected by a central flange, wherein said mounting plate is connected under said ribs and parallel said central flange.

7. The shelf system of claim 6, wherein aligned apertures are located through said ribs, a bushing is located in said rib apertures and a spanner bracket fastener is located in said bushing, wherein said bushing, said rib apertures and said spanner bracket fastener form part of, and are aligned with, said pivot axis.

8. The shelf system of claim 7, wherein said spanner bracket is L-shaped, and said second end portion has an aperture for receiving said spanner bracket fastener therethrough, wherein said spanner bracket cantilevers said shelf member from said upright member.

9. The shelf system of claim 8, wherein said aperture in said second end portion of said spanner bracket forms part of, and is aligned with, said pivot axis.

10. A shelf system, comprising:
a first upright member and a second upright member, said upright members forming an upright member plane,
at least one floor rail with a U-shaped cross section comprised of an inner lip and an outer lip separated by an offset, wherein the outer lip is located in the upright member plane,
at least one mid-rail with a Z-shaped cross section comprised of a upstanding flange, a mid-span flange and a downstanding flange, wherein the downstanding flange is coplanar with the outer lip and the upright member plane;
at least one upper rail of substantially constant thickness, wherein said rail has a longitudinal portion and at least one transverse portion extending from the longitudinal portion, wherein said upper rail resides in said upright member plane.

11. The shelf system of claim 10, wherein said upright members comprise a central flange bounded by two side flanges, wherein said side flanges reside in said upright member plane.

12. The shelf system of claim 10, wherein at least one cross piece spans between and connects said upright members together.

13. The shelf system of claim 10, wherein a planar panel is located between said upright members and attached to said side flanges so that said planar panel is located in said upright member plane.

14. The shelf system of claim 10, further comprising a shelf member adapted for pivotal attachment to said upright members via a biasing member connected to one of said upright members and said shelf member.

15. The shelf system of claim 14, further comprising a pivot axis for said shelf member with respect to a spanner bracket connected to an upright member, wherein said pivot axis is located above a connection between a biasing member and the shelf member, wherein said pivot axis is comprised of aligned apertures in ribs of an under-shelf bracket, a bushing in said apertures, and a fastener in said bushing.

16. A method of pivoting a shelf in a shelf system, comprising:
providing a shelf member adapted to be moved between a raised position and a lowered position, wherein an under-shelf bracket supports the shelf member;
pivoting said shelf member about a pivot axis formed through portion of a spanner bracket connecting said shelf member to a stationary upright member, said pivot axis located above of an under-shelf bracket and a biasing member intersection;
changing the length of a biasing member while simultaneously changing the angle of the biasing member with respect to the stationary upright member when pivoting the shelf member between the raised position and the lowered position;
cantilevering said shelf member from said at least one upright member with said spanner bracket,
wherein a second end of said biasing member is connected to a rear portion of the shelf member.

17. The method of claim 16, further comprising accommodating a central flange of said upright member within an upright member recess in a back edge portion of said shelf member when said shelf member is in the lowered position.

18. The method of claim 17, further comprising accommodating a spanner bracket within a spanner bracket recess in said back edge portion of said shelf member when said shelf member is in the lowered position, wherein said spanner bracket recess is connected to said upright member recess.

19. The method of claim 16, wherein in said lowered position, said shelf member does not extend into an upright member plane formed by said upright member, a portion of a floor rail, a portion of at least one mid-rail and a portion of at least one upper rail.

* * * * *